UNITED STATES PATENT OFFICE.

BEE B. CLAWSON, OF OAKLAND, CALIFORNIA.

HYDROCARBON COMPOSITION.

SPECIFICATION forming part of Letters Patent No. 692,627, dated February 4, 1902.

Application filed November 4, 1901. Serial No. 81,064. (No specimens.)

*To all whom it may concern:*

Be it known that I, BEE B. CLAWSON, a citizen of the United States, residing at Oakland, in the county of Alameda and State of California, have invented a certain new and useful Improvement in Hydrocarbon Compositions; and I do hereby declare the following to be a full, clear, and exact description of the invention, such as will enable those skilled in the art to which it appertains to make and use the same.

This invention is of a composition of matter which is specially and particularly adapted to the preparation of a cement for floors, pavements, and other purposes and is susceptible of use in the manufacture of floor and roof coverings, insulating tapes, sheets, and tubes, handles, buttons, knobs, gaskets, washers, cups, and many other articles.

The ingredients utilized in making this composition are as follows: asphaltum, bituminous rock, sand or like material, the mineral now commonly known as "uintahite" or "gilsonite," and litharge. A vital objection to the compositions heretofore made in which these materials or any of them have been used is based on the fact that an oil of some description has been required as a flux in order to put the mixtures in condition to work or spread and that such use of oil has caused the resultant products to be quite inflammable. A further objection to said last-mentioned compositions lies in the fact that articles made of them are exceedingly brittle and are easily cracked and broken in moderately low temperatures and lose form and rigidity at temperatures slightly higher than ordinary sun heat. These undesirable characteristics are not present in this invention.

In preparing for use this my invention I proceed in the following manner: I take a sufficient quantity of asphaltum and place it in a kettle for melting. The temperature thereunder is then raised until the asphaltum is thoroughly liquefied. The bituminous rock is then introduced into the kettle and the heat kept up until it, too, is thoroughly melted and united with the asphaltum. In the meantime the uintahite or gilsonite has been placed in another kettle, together with about twenty per cent. of its weight of hot asphaltum, and has been reduced to a liquid condition by the application of heat, the heat being so regulated that the said uintahite or gilsonite is melted without destroying its properties of pliability and toughness, care being necessary to make this result certain. This is then allowed to cool slightly and about twenty per cent. of its weight of commercial litharge is added and mixed in by stirring. When all of the above preparation is complete, the whole of said materials is brought together in a suitable container and from five per cent. to fifteen per cent. of its total weight of fine clean sand is added to the mass and thoroughly mixed therewith, the quantity of sand so added determining the degree of hardness of the finished product. In place of sand I can use ground or powdered asbestos, mica, talc, or diatomaceous or argillaceous earth. Thereupon, the whole mass being together, it is then subjected to a sufficiently high degree of heat to, with vigorous stirring or agitation, effect a complete physical and chemical union of the ingredients. The stirring or agitation may be performed by ordinary mechanical means or by the use of compressed air. This temperature and agitation is maintained for a sufficient length of time, after which the material is ready for spreading, molding, saturating, or other necessary process for fashioning the articles to be made thereof.

I am aware that various compositions containing asphaltum as well as some of the other ingredients mentioned herein have been patented or have been in use from time to time; but I am not aware nor do I believe that all of the ingredients of my composition have ever heretofore been used together.

In factory practice I have obtained satisfactory results by the use of the following proportions: one part or one hundred pounds of asphaltum, three parts or three hundred pounds of bituminous rock, one part or one hundred pounds of uintahite or gilsonite, one-half part or fifty pounds of sand or like material, and one-twentieth part or five pounds of litharge.

Having thus fully described my invention, what I claim, and desire to secure by Letters Patent, is—

1. The herein-described composition of matter, consisting of asphaltum, bituminous rock, sand or like material, the mineral "uintahite" or "gilsonite," and litharge, substantially as described and for the purposes specified.

2. The herein-described composition of matter, consisting of asphaltum one hundred pounds, bituminous rock three hundred pounds, "uintahite" or "gilsonite" one hundred pounds, sand or like material fifty pounds, and litharge five pounds, all substantially as described.

In witness whereof I have signed my name hereto in the presence of two subscribing witnesses.

BEE B. CLAWSON.

Witnesses:
CRAIGIE SHARP,
IRVING J. LUCE.